(12) United States Patent
Simanjuntak et al.

(10) Patent No.: US 9,952,119 B2
(45) Date of Patent: Apr. 24, 2018

(54) SYSTEM FOR OPERATING A TOP DRIVE ASSEMBLY FOR SUBTERRANEAN OPERATIONS

(71) Applicant: Canrig Drilling Technology Ltd., Houston, TX (US)

(72) Inventors: Godwin Simanjuntak, Houston, TX (US); Michael Macklin, Tomball, TX (US)

(73) Assignee: Canrig Drilling Technology Ltd., Houston, TX (US)

( * ) Notice: Subject to any disclaimer, the term of this patent is extended or adjusted under 35 U.S.C. 154(b) by 543 days.

(21) Appl. No.: 14/637,571

(22) Filed: Mar. 4, 2015

(65) Prior Publication Data

US 2015/0268129 A1     Sep. 24, 2015

Related U.S. Application Data

(60) Provisional application No. 61/954,953, filed on Mar. 18, 2014.

(51) Int. Cl.
| | | |
|---|---|---|
| *G01M 13/02* | (2006.01) | |
| *E21B 3/02* | (2006.01) | |
| *E21B 19/16* | (2006.01) | |
| *E21B 19/18* | (2006.01) | |

(52) U.S. Cl.
CPC ............. *G01M 13/021* (2013.01); *E21B 3/02* (2013.01); *E21B 19/16* (2013.01); *E21B 19/18* (2013.01)

(58) Field of Classification Search
CPC ............ E21B 3/02; E21B 19/16; E21B 19/18; G01M 13/021
See application file for complete search history.

(56) References Cited

U.S. PATENT DOCUMENTS

| | | |
|---|---|---|
| 5,157,983 A | 10/1992 | Sankovic |
| 2007/0251701 A1* | 11/2007 | Jahn ..................... E21B 19/166 166/379 |
| 2009/0139478 A1 | 6/2009 | Dell et al. |
| 2011/0280104 A1 | 11/2011 | McClung, III |
| 2012/0152619 A1 | 6/2012 | Hofste et al. |
| 2013/0133899 A1 | 5/2013 | Holliday et al. |

FOREIGN PATENT DOCUMENTS

| | | |
|---|---|---|
| EP | 1606493 B1 | 12/2007 |
| JP | 2013088121 A | 5/2013 |
| KR | 20080033362 A | 4/2008 |

(Continued)

OTHER PUBLICATIONS

International Search Report for Application No. PCT/2015/018574 filed Mar. 4, 2015, dated Jun. 3, 2015, 1 page.

*Primary Examiner* — Yong-Suk Ro
(74) *Attorney, Agent, or Firm* — Enrique Abarca; Abel Law Group, LLP

(57) ABSTRACT

A drilling assembly including a sensor coupled to a gear, the gear in direct or indirect rotational communication with a component of drilling assembly, such as a bull gear or a pipe handler. The drilling assembly further including a logic device configured to calculate a wear status of the drilling assembly, indicating wear of one or more components of the drilling assembly. The logic device can also be configured to calculate an alignment value of the gear for engagement of a locking device.

17 Claims, 10 Drawing Sheets

(56) References Cited

FOREIGN PATENT DOCUMENTS

| WO | 2006/026080 A2 | 3/2006 |
| WO | 2007/070805 A2 | 6/2007 |
| WO | 2012/092476 A2 | 7/2012 |
| WO | 2013/082498 A2 | 6/2013 |
| WO | 2015/142515 A1 | 9/2015 |

* cited by examiner

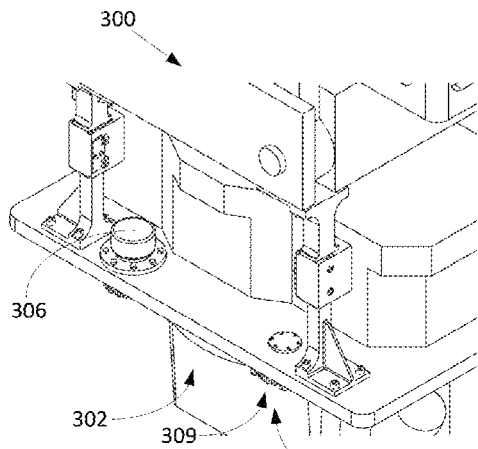
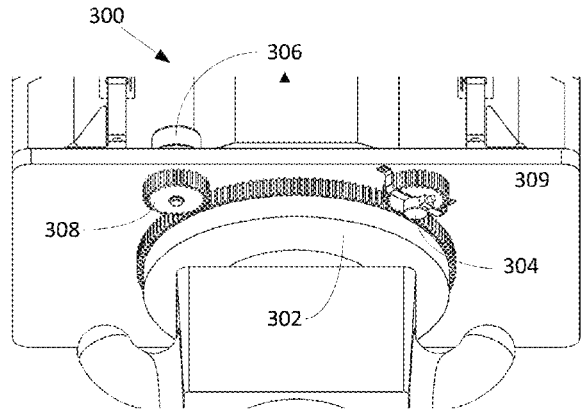
FIG. 3b  FIG. 3c
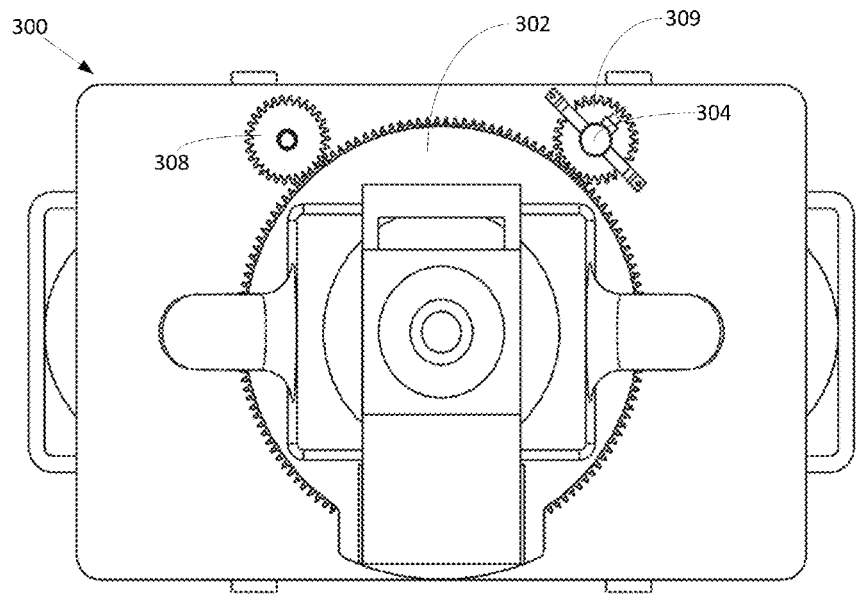
FIG. 3d

SYSTEM FOR OPERATING A TOP DRIVE ASSEMBLY FOR SUBTERRANEAN OPERATIONS

CROSS-REFERENCE TO RELATED APPLICATION(S)

This application claims priority under 35 U.S.C. §119(e) to U.S. Patent Application No. 61/954,953, entitled "SYSTEM FOR OPERATING A TOP DRIVE ASSEMBLY FOR SUBTERRANEAN OPERATIONS," by Godwin SIMAN-JUNTAK and Michael MACKLIN, filed Mar. 18, 2014, which is assigned to the current assignee hereof and which is incorporated herein by reference in its entirety.

FIELD OF THE DISCLOSURE

The following is generally directed to a system for use in subterranean operations, and more particularly to a system for detecting wear of, and for engaging a locking device on, a top drive assembly.

DESCRIPTION OF THE RELATED ART

Drilling devices for use in subterranean operations can include a top drive that is typically structurally supported by a derrick. The top drive has become one of the biggest breakthroughs in drilling technology since it was first commercialized in the 1970s. Its advent has brought vast time savings and increased revenue over the kelly drive by allowing drillers to assemble and use longer drill strings, typically including about 90-ft long assemblies made from 3 sections of drill pipe, rather than limiting drillers to only a single section of about 30-ft drill pipe employable in the kelly drive. As with any drilling system, however, regular maintenance and timely repair are typically required, and untimely or unanticipated repairs can result in lost drilling time and lost revenue.

A significant portion of top drive maintenance and repair relates to motors, gears, and associated bearings and seals. In a typical drilling device such as a top drive, one or more main motors are connected directly or indirectly to gears that function to drive a main shaft. Moving components such as these typically suffer the greatest or most frequent wear. However, increased costs associated with maintenance and repair can be exacerbated due to the fact that many drilling operations are located in remote areas where spare parts and service technicians may not be readily available, especially if the repairs are untimely or unanticipated. For example, spare motors, gears and associated bearings and seals may require ordering time, and service technicians may require scheduling and transportation.

The industry continues to demand improvements for operating a system for subterranean operations.

BRIEF DESCRIPTION OF THE DRAWINGS

The present disclosure may be better understood, and its numerous features and advantages made apparent to those skilled in the art by referencing the accompanying drawings.

FIG. 2b includes a perspective view of the top drive assembly of FIG. 2a.

FIG. 2c includes a perspective view of the top drive assembly of FIG. 2a.

FIG. 2d includes a perspective view of the top drive assembly of FIG. 2a.

FIG. 3b includes a perspective view of the top drive assembly of FIG. 3a.

FIG. 3c includes a perspective view of the top drive assembly of FIG. 3a.

FIG. 3d includes a perspective view of the top drive assembly of FIG. 3a.

The use of the same reference symbols in different drawings indicates similar or identical items.

DETAILED DESCRIPTION

Figure 1:
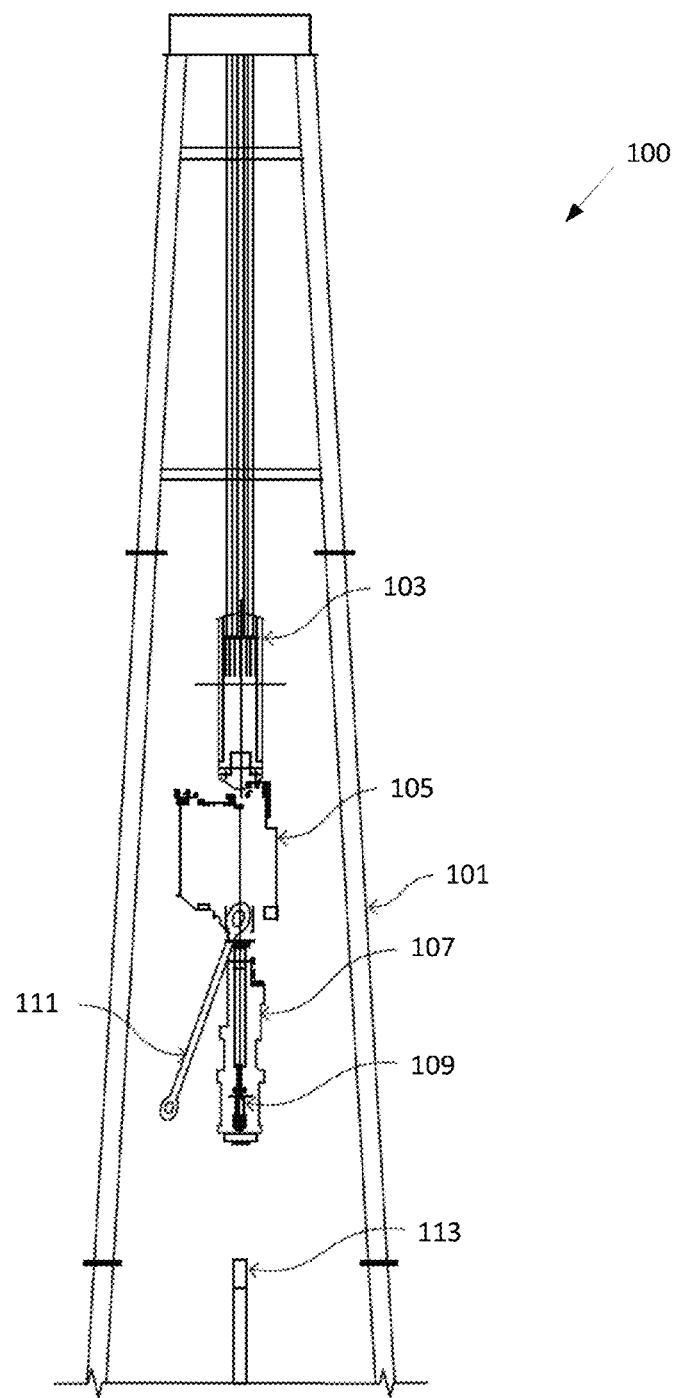
FIG. 1 includes an illustration of a portion of a drilling derrick including a top drive assembly in accordance with an embodiment.

The following is directed to systems for operating a drilling device for subterranean operations, including but not limited to drilling operations directed to resources such as natural gas and oil. The present embodiments include description of one or more components of a system that may be employed in various drilling operations and may be utilized on land or on water. Referring briefly to FIG. 1, an illustration of a portion of a drilling derrick including a top drive assembly in accordance with an embodiment. As illustrated, system 100 can include a drilling derrick 101 that can provide a structure for holding and operation of the tools used in the drilling operation. The system 100 can further include a traveling block 103 facilitating the movement of a top drive assembly 105 on the derrick 101. As illustrated, the top drive assembly 105 can be coupled to the traveling block 103 and move vertically within the derrick 101. The system can further include a pipe handler assembly 107 and a fill-up and circulation tool 109 coupled to the top drive assembly 105. Additionally, in some instances, the top drive assembly 105 can further include elevator links 111. The pipe handler 109 can be positioned above a casing stump 113, which may extend above a floor of the derrick 101 and may be operably coupled to the casing stump during particular operations.

Figure 2A:
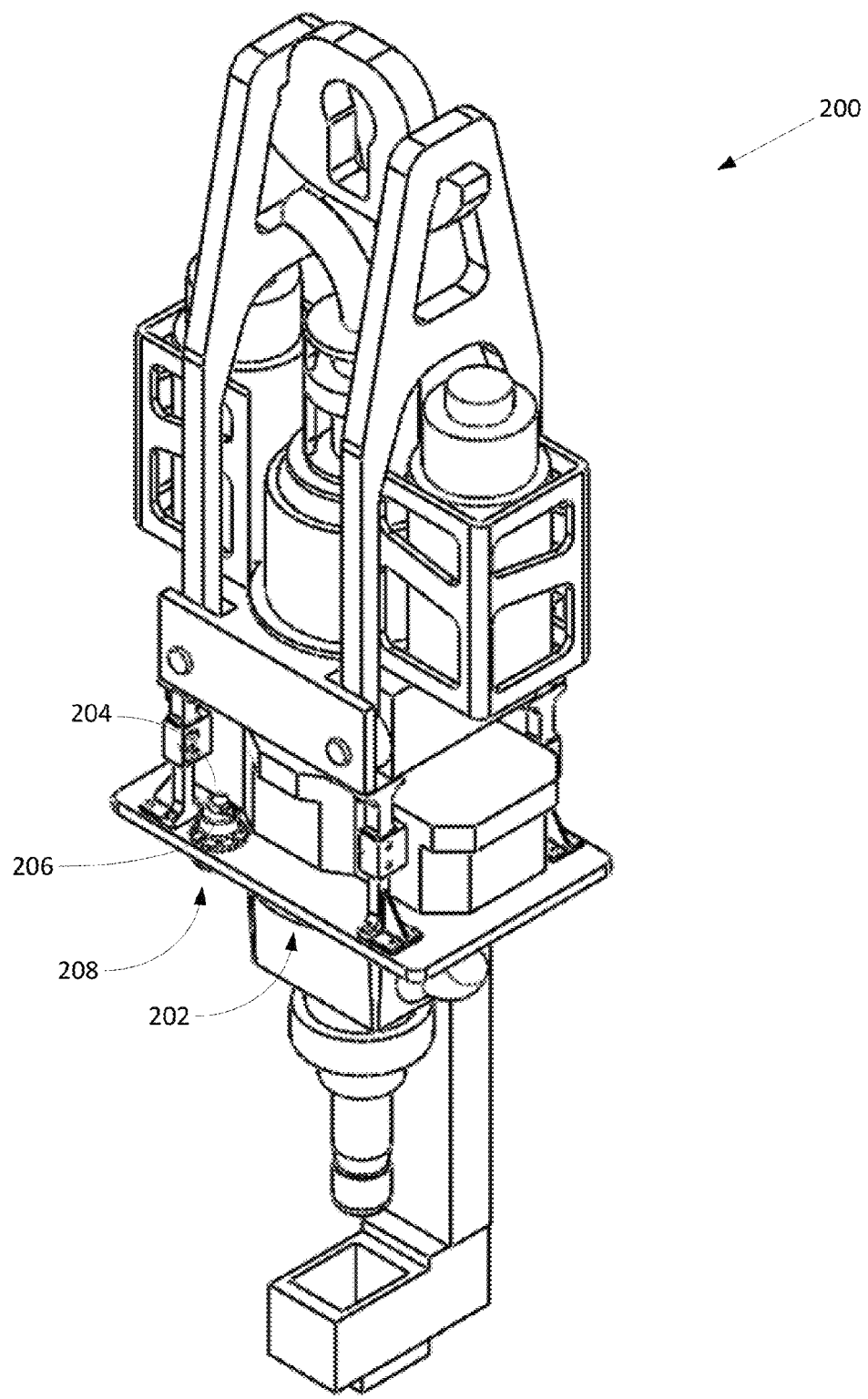
FIG. 2a includes an illustration of a portion of a top drive assembly in accordance with an embodiment.

FIG. 2a includes an illustration of a portion of a top drive assembly 200 for manipulating tubulars for use in subterranean operations in accordance with an embodiment. In particular, the top drive assembly 200 can include a main motor 201. Typically, the main motor 201 functions to rotate a drill string (not shown). As used herein, a drill string can include one or more sections of drill pipe. A drill string can have a drill bit attached at one end of the drill string that, when rotated by the main motor, can function to produce a wellbore.

Typically, a drill string must first be acquired by the top drive assembly in order to allow the main motor to rotate the drill string. One method of acquiring a drill string can include the use of a pipe handler. In accordance with an embodiment, a pipe handler assembly (not illustrated) can be rotatably coupled to the top drive assembly 200. In particular, the top drive assembly 200 can include a pipe handler assembly rotatably coupled to, or in rotational communication with, the top drive assembly 200 though a bull gear 202. In one or more embodiments, the bull gear 202 can be coupled directly or indirectly to the pipe handler assembly. It will be appreciated that the pipe handler assembly can be oriented in several positions suitable for performing one or more functions of the top drive assembly, such as, for example, acquiring a drill string, providing a drill string to the top drive assembly or main motor, performing a drilling operation (e.g., producing a wellbore), or moving the drill string in and out of a wellbore (e.g., tripping pipe).

In accordance with an embodiment, the top drive assembly 200 can include a drive motor 206, which can be adapted to drive, or rotate, the bull gear 202. It will be appreciated that in an embodiment including a pipe handler assembly coupled to the bull gear 202, rotation of the drive motor 206 can affect rotation of the pipe handler assembly. In a particular arrangement of the top drive assembly 200, the drive gear 206 can be rotatably engaged to the bull gear 202 through a drive pinion gear 208.

Figure 2B:
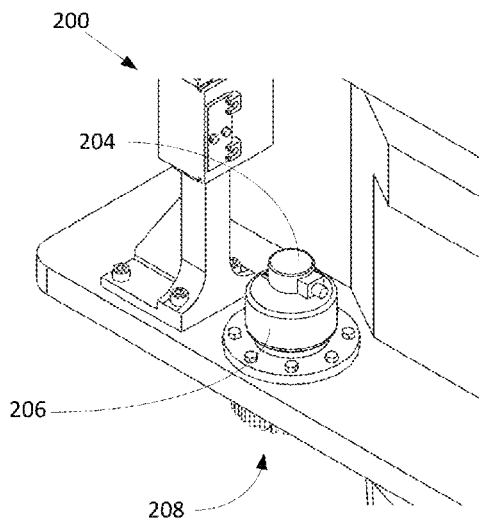
Figure 2C:
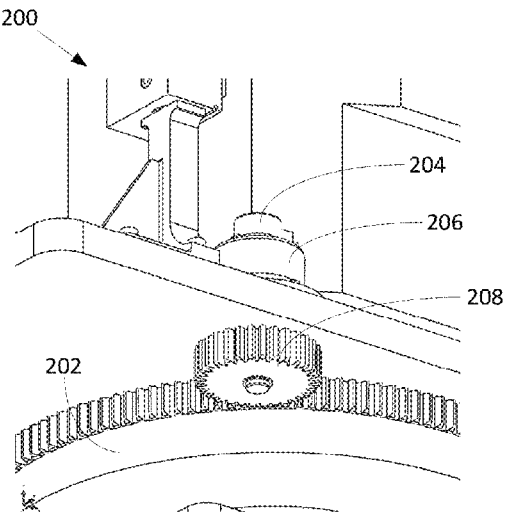
Figure 2D:
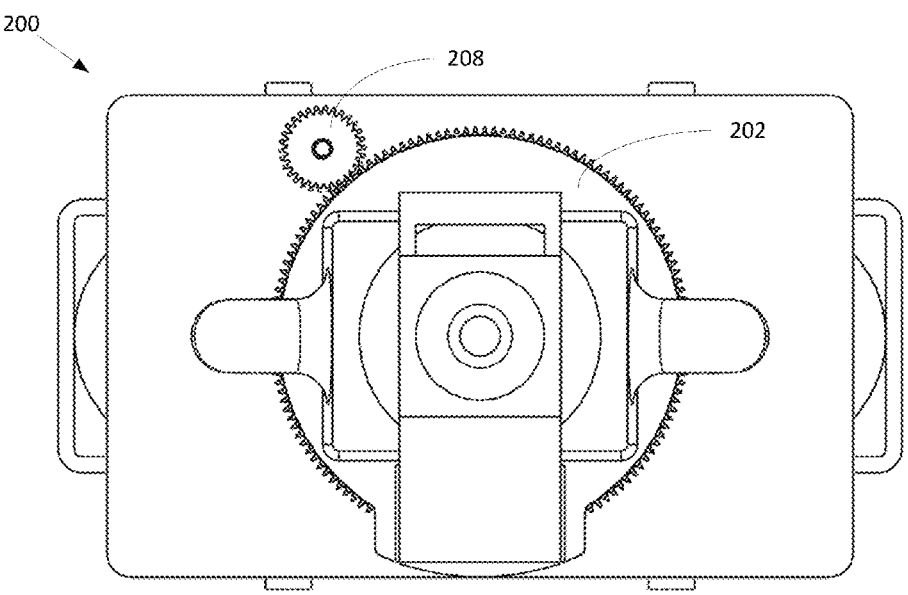

FIGS. 2b-2d illustrate different perspectives of a portion of a top drive assembly 200 in accordance with the embodiment of FIG. 2a, including a bull gear 202, drive motor 206, and drive pinion gear 208. As illustrated, the drive pinion gear 208 can be rotatably coupled to drive motor 206, and rotatably engaged with bull gear 202. The bull gear 202 or drive pinion gear 208 can be configured to rotate the pipe handler assembly coupled to the top drive assembly 200. It will be appreciated that operation of the drive motor 206 can cause rotation of the drive pinion gear 208, which can cause rotation of the bull gear 202, which can in turn cause rotation of a component coupled to the bull gear 202, such as a pipe handler assembly (not shown).

Figure 3A:
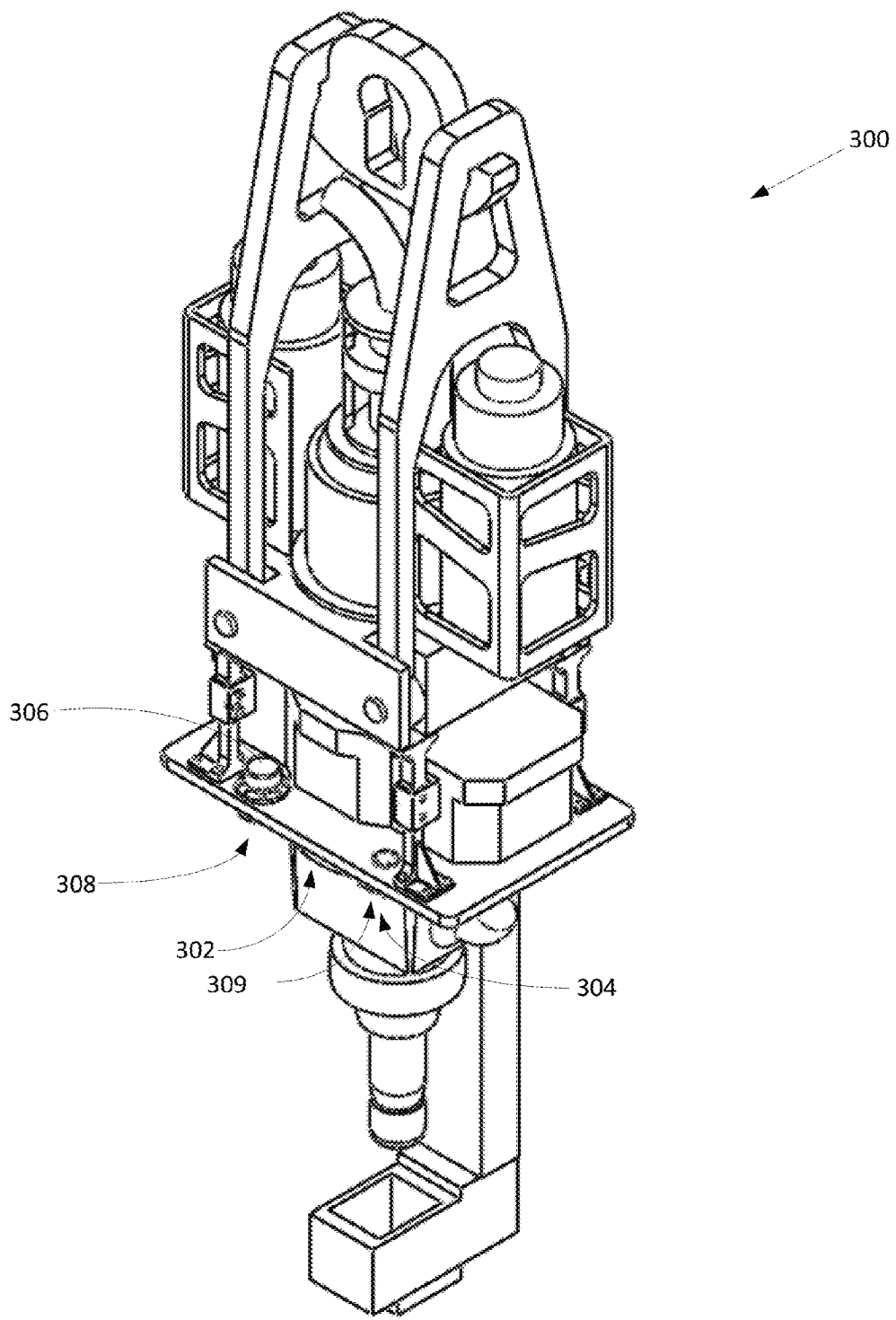
FIG. 3a includes an illustration of a portion of a top drive in accordance with an embodiment.

Referring to FIG. 3a, a top drive assembly 300 according to an embodiment can include a drive motor 306, drive pinion gear 308, and bull gear 302 arranged similarly to the embodiments of FIGS. 2a-2d. In another aspect, however, an embodiment according to that illustrated in FIG. 3a can include a separate pinion gear 309. The separate pinion gear 309 can be located on the top drive assembly 300 at a different location than on the drive motor 306. In an embodiment, the separate pinion gear 309 can be rotatably engaged with bull gear 302. Locating the separate pinion gear 309 other than on the drive motor 300 may be desirable due to various consideration, such as, for example, space constraints or accessibility of the drive motor 306 or separate pinion gear 309. Moreover, locating the separate pinion gear 309 other than on the drive motor 306 may be desirable due to space constraints or accessibility of one or more other components coupled to the drive motor 306 or separate pinion gear 309, such as a sensor, which is described herein.

FIGS. 3b-3d illustrate different perspectives of a portion of a top drive assembly 300 in accordance with the embodiment of FIG. 3a, including a bull gear 302, drive motor 306, and drive pinion gear 308. As further illustrated, a separate pinion gear 309 can be located on the top drive assembly 300 at a different location other than on the drive motor 306. For example, separate pinion gear 309 can be located at a position along the perimeter of, and rotatably engaged to, the bull gear 302.

Referring generally back to FIGS. 2a-2d, a top drive assembly 200 can include a sensor 204. In accordance with an embodiment, the sensor 204 can measure the rotation, angular speed, or position of a gear of the top drive assembly 200. In an embodiment, the sensor 204 can be a rotary encoder. In general, a rotary encoder functions to convert rotational motion to an electrical signal. It will be appreciated that a rotary encoder can be of any type or platform as those known in the art, including, for example, mechanical, optical, magnetic, capacitive, absolute, incremental, or other rotary encoder known in the art. In a particular embodiment, the sensor 204 is an absolute rotary encoder.

As illustrated in FIGS. 2a-2d, for example, the sensor 204 can be coupled to the drive motor 206, and the drive motor 206 can in turn be coupled to the drive pinion gear 208. This particular arrangement allows the sensor 204 to be coupled indirectly to the drive pinion gear 108. Thus, it will be understood that the sensor 204 can measure the rotational orientation not only of the drive motor 206, but of the drive pinion gear 208 as well. In an embodiment, as illustrated in FIGS. 2a-2d, the drive pinion gear 208 can be rotatably coupled to the bull gear 202. Thus, in this particular arrangement, it will also be appreciated that the sensor can measure the rotational orientation of the bull gear 202.

In other embodiments, a sensor may be located elsewhere than on the drive motor, and may perform similar or different tasks as described herein with respect to sensor 204. For example, referring to FIG. 3a, the top drive assembly 300 can include a sensor 304 coupled to a separate pinion gear 309. FIGS. 3b-3d illustrate different perspectives of a portion of a top drive assembly 300 that include the sensor 304 coupled to the separate pinion gear 309. Although exemplary arrangements of a sensor are discussed herein, it will be appreciated that a sensor can be coupled to any component of a top drive assembly, such as, for example, a drive pinion gear, a bull gear, a separate pinion gear, a drive motor, or a combination thereof.

Figure 4:
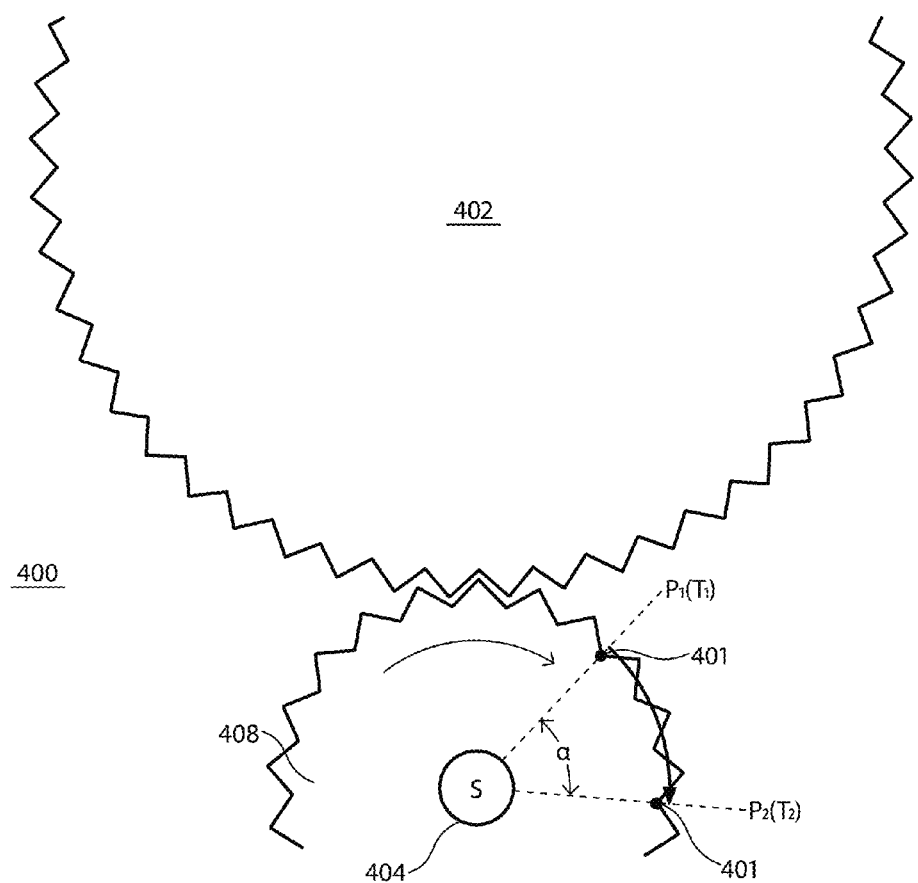
FIG. 4 includes an illustration representing rotational orientations of one or more gears in accordance with an embodiment.

FIG. 4 illustrates a sensor 404 coupled to a gear 408 on a top drive assembly 400, which is in turn rotationally coupled to a bull gear 402. In an embodiment, the gear 408 can be a drive pinion gear, for example, directly coupled to a drive motor. In another embodiment, the gear 408 can be a separate pinion gear that is not directly coupled to a drive motor.

In accordance with an embodiment, the sensor 404 can be configured to generate one or more signals relating to one or more positions of the gear 408. The one or more signals can include particular position information. For example, the sensor 404 can be configured to generate a signal at a first position ($P_1$) of the gear 408. The first position ($P_1$) can be defined by a degree of rotation with respect to a predetermined origin. For example, the first position ($P_1$) can be any degree ranging from 0°-360° of point 301 with respect to a point (i.e., predetermined origin) on the top drive assembly 300, such as the first position ($P_1$). As used herein, a range of 0°-360° includes all degrees greater than and including 0°, and all degrees less than and including 360°.

In an embodiment, the first position ($P_1$) can include information indicating current gear position. As used herein, current gear position refers to a position of a gear at a particular point in time. Thus, the first position ($P_1$) can indicate a position of the gear 408 at a particular point in time ($T_1$). In an embodiment, the first position ($P_1$) and time ($T_1$) can indicate a position and time at which motion of the gear 408 is initiated. As the gear 408 is rotated (e.g., clockwise, as indicated by the arrows in FIG. 4), point 401 can move to a different location with respect to the original predetermined point on the top drive assembly 400, such as the first position ($P_1$). For example, the gear 408, and thus the point 401, can rotate from the first position ($P_1$) at a first time to a second position ($P_2$) at a second time ($T_2$). In an embodiment, a difference between ($P_1$) and ($P_2$) can be defined as a swing angle, illustrated by angle α.

In at least one embodiment, the sensor 404 can be configured to generate a signal at the second position ($P_2$) of the gear 408. The second position ($P_2$) of the gear 408 can be the same or different as the first position ($P_1$) of the gear 408.

In particular embodiments, the position information can include ($P_1$) and/or ($P_2$). It will be appreciated that position information, such as ($P_1$) and/or ($P_2$) of the gear 408, can be used to derive position (or rotational orientation) of one or more other components of the top drive assembly, such as the a drive motor gear, a bull gear (402), a drive pinion gear, or a pipe handler assembly.

In an embodiment, the first position ($P_1$) can be a position of the gear 408 at which rotational power applied to the gear 408 is ceased. In this aspect, the swing angle α can be defined as a maximum angle of rotation experienced by a component in rotational communication with a gear from a stop-power time to a stop-motion time. For example, it will be understood that power can be provided to cause rotation of the gear 408. The moment the power is ceased can define the stop-power time. However, rotation of the gear 408 may not immediately cease at the stop-power time. The moment that rotation of the gear 408 is finally ceased can be defined as the stop-motion time. The maximum rotational angle experienced between the stop-power time and the stop-motion time can be defined as swing angle α, although it will be appreciated that the gear 408 may finally come to rest at a particular position within the swing angle α.

It will be appreciated that swing angle α can represent "slack" in one or more components of the top drive assembly and, in an embodiment, the existence of any swing angle α can indicate wear. However, in some embodiments, some wear may be acceptable up to a threshold value. The threshold value may be chosen based upon certain specification for various components of the top drive assembly. For example, the threshold value can be at least about 0°, such as at least about 1°, at least about 2°, at least about 3°, at least about 4°, at least about 5°, at least about 6°, at least about 7°, at least about 8°, at least about 9°. In a non-limiting embodiment, the threshold value can be not greater than about 10°. For example, the threshold value can be not greater than about 9°, such as not greater than about 8°, not greater than about 7°, not greater than about 6°, not greater than about 5°, not greater than about 4°, not greater than about 3°, not greater than about 2°, or even not greater than about 1°. It will be appreciated that the threshold value can be in a range of any maximum or minimum value indicated above. In a particular embodiment, the threshold value can be in a range of 0° and about 1°.

A level or degree of wear within or beyond the threshold value can be indicated by a wear status value. In accordance with an embodiment, the wear status value can be the same as or different than the threshold value. For example, the wear status value can be at least about 0°, such as at least about 1°, at least about 2°, at least about 3°, at least about 4°, at least about 5°, at least about 6°, at least about 7°, at least about 8°, or even at least about 9°. In a non-limiting embodiment, the wear status value can be not greater than about 10°. For example, the wear status value can be not greater than about 9°, such as not greater than about 8°, not greater than about 7°, not greater than about 6°, not greater than about 5°, not greater than about 4°, not greater than about 3°, not greater than about 2°, or even not greater than about 1°. It will be appreciated that the wear status value can be in a range of any maximum or minimum value indicated above.

In an embodiment, comparison of a wear status value to a threshold value can include determining if the wear status value is equal-to the threshold value. In an embodiment, comparison of a wear status value to a threshold value can include determining if the wear status value is greater than the threshold value. In an embodiment, comparison of a wear status value to a threshold value can include determining if the wear status value is less than the threshold value. In an embodiment, comparison of a wear status value of a threshold value can include determining the degree to which the wear status value is less than or greater than the threshold value. For example, the wear status value can be about 1° less than the threshold value, such as about 2°, 3°, 4°, or even about 5° less than the threshold value. In a non-limiting embodiment, the wear status value can be about 1° greater than the threshold value, such as about 2°, 3°, 4°, or even about 5° greater than the threshold value. It will be appreciated that determining the degree to which the wear status value is less than or greater than the threshold value can include a degree within a range of 0°-360°.

In an embodiment, a comparison of the wear status value to the threshold value can indicate a wear status. For example, the wear status can indicate a degree of wear, such as a degree of wear that is acceptable, unacceptable, or even nearly unacceptable. The wear status can be indicated visually. For example, the wear status can be indicated by a numerical value or symbol, etc., and can be indicated on a display screen, such as a monitor of a computer. In another embodiment, the wear status can be indicated by a light. For example, the degree of wear can be indicated by a green light (i.e. acceptable), red light (unacceptable), or yellow light (nearly unacceptable). In yet another embodiment, the wear status can be indicated audibly, such as, for example, an alarm. The alarm can be configured to sound when the degree of wear indicated by the wear status has reached an unacceptable degree.

Figure 5:
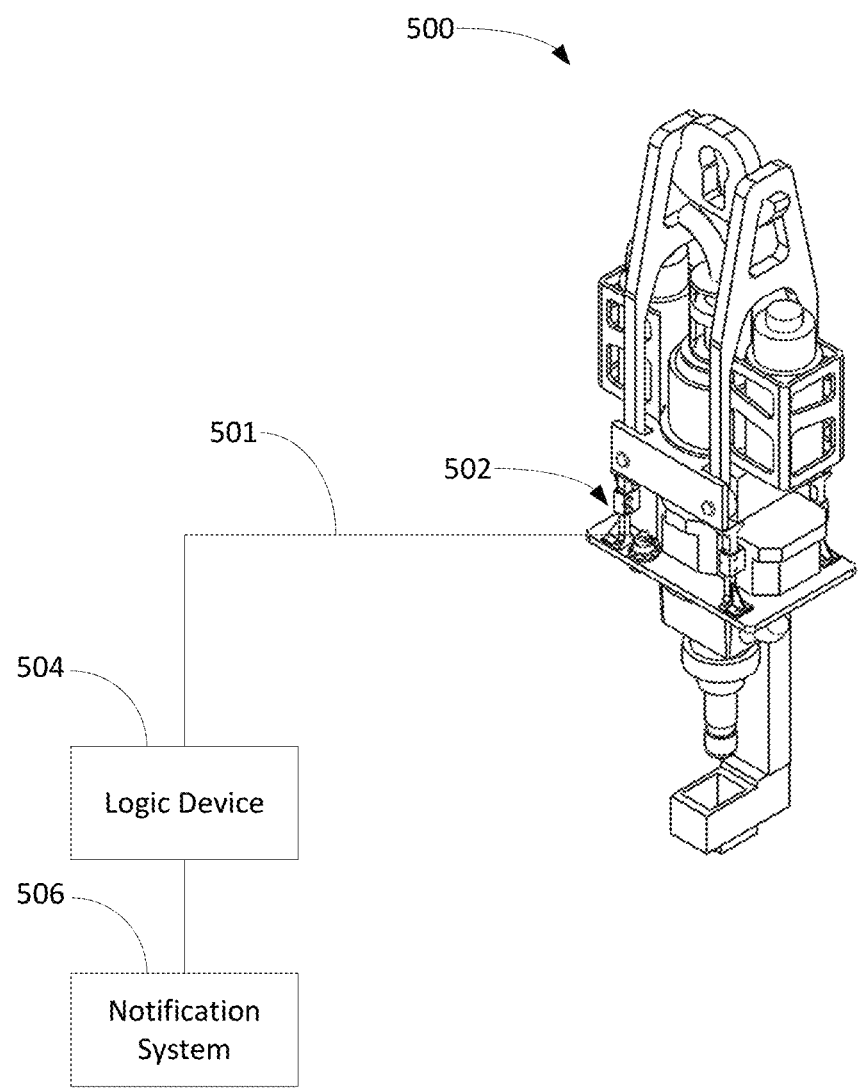
FIG. 5 includes an illustration of an embodiment including a logic device.

The determination or calculation of embodiments described herein may require the employment of a logic device, and particular a logic device in signal communication with one or more components of the top drive assembly. In accordance with particular embodiments, a system for use in subterranean operation can further include a logic device in communication with a sensor. For example, FIG. 5 illustrates an embodiment including a top drive assembly 500 and a logic device 504 in signal communication with a sensor 502 through one or more signals 501. It will be appreciated that the logic device 504 can be located onsite, such as on a derrick or in a control room on or near the top drive assembly. The logic device 504 may also be located off site with respect to the top drive assembly 500, such as at a control room located in a separate building not within immediate visual distance from the top drive assembly 500. The logic device 504 can be a mechanical, optical, or electronic system that performs a logical operation on an input signal. In a particular embodiment, the logic device 504 can be a processor configured to receive the one or more signals 501 from the sensor 502 and conduct one or more processes, such as store, read, and/or write, data for analysis and control of one or more components of the system.

In accordance with an embodiment, the logic device 504 can be configured to receive a signal 501 from the sensor 502 and calculate a wear status of the top drive assembly 500. The wear status can indicate wear on at least one component of the top drive assembly 500, such as a component in rotational communication with a gear of a top drive assembly 500, as discussed in accordance with the embodiments herein. For example, the wear status can indicate wear on a drive motor gear, a bull gear, a drive pinion gear, or a pipe handler.

In accordance with an embodiment, the logic device 504 can be configured to calculate a wear status based upon a comparison of the position information with stored data. In an embodiment, stored data can include stored position information. In an embodiment, the stored position information can include the second position of a gear, as discussed herein. In an embodiment, the stored data can include wear status information. In an embodiment, the stored data can include previous position information. In an embodiment, the stored data can include a threshold value, as discussed herein.

In an embodiment, the stored data can include a moving average of position information received at two or more times. As is known to skilled artisans, a moving average can be defined as a calculation of an average of a series of averages of different subsets of a full data set. Depending on which series of averages are chosen (i.e. which averages of which subsets are chosen), the moving average can include a different value. Thus, a moving average can indicate long-term and short-term trends, or their fluctuations, by using a series of averages representing different time subsets. In accordance with an embodiment, a comparison of the position information with stored data including a moving average of position information received at two or more times can indicate a trend in wear of one or more components of a top drive assembly.

In accordance with an embodiment, the logic device 504 can be configured to notify a user. For example, the wear status can be indicated on or by a notification system 506, as illustrated in FIG. 5. In particular, the notification system 506 can be in signal communication with the logic device 504. The notification system 506 can include any visual or audible device known in the art, including those discussed here. Similar to the logic device 504, the notification system 506 can be located on-site or off-site with respect to the top drive assembly 500.

Notifying a user can be accomplished by any method known in the art. For example, notifying a user can include generating a signal and sending the signal to activate an alarm, sending the signal to an offsite monitoring system, or sending the signal to display optical indicia. In an embodiment, optical indicia can include one or more lights such as, for example, colored lights that may be chosen to indicate a wear status as discussed herein. In an embodiment, optical indicia can include output on a display monitor or screen.

In accordance with an embodiment, a logic device can be configured to notify a user based upon the wear status. For example, as discussed herein with respect to at least one embodiment, the wear status can indicate a degree of wear, such as a degree of wear that is acceptable, unacceptable, or even nearly unacceptable. For example, the degree of wear can be indicated by a green light (i.e. acceptable), red light (unacceptable), or yellow light (nearly unacceptable). In another embodiment, the degree of wear can be indicated by a numerical value, etc.

Figure 6:
FIG. 6 includes a picture of a locking device coupled to a gear of a top drive in accordance with an embodiment.

In another aspect, a top drive assembly according to an embodiment can include a locking device. FIG. 6 includes a photo of a locking device coupled to a bull gear 604 of a top drive assembly 600 in accordance with an embodiment. A locking device can be defined as a device that can be engaged to lock, or prevent, the rotation of one or more gears of the top drive assembly. For example, the one or more gears can include a drive motor gear, a pinion gear, or a bull gear. In particular, the one or more gears may be directly or indirectly coupled to a pipe handler assembly of the top drive assembly. Thus, engagement of the locking device to prevent rotation of the one or more gears of the top drive assembly can effectively prevent rotation of the pipe handler assembly or other component directly or indirectly coupled to the gear to which the locking device is configured to engage.

A pipe handler assembly may be oriented in various configurations for performing various functions, as discussed herein. It may be desirable to prevent rotation of the pipe handler assembly while it is in one of the various configurations in order to prevent injury of personnel in and around the top drive assembly. Further, preventing rotation of the pipe handler assembly in a particular configuration may aid to more effectively perform one of the various functions of the top drive assembly, such as wellbore drilling or pipe tripping, or example.

Figure 7:
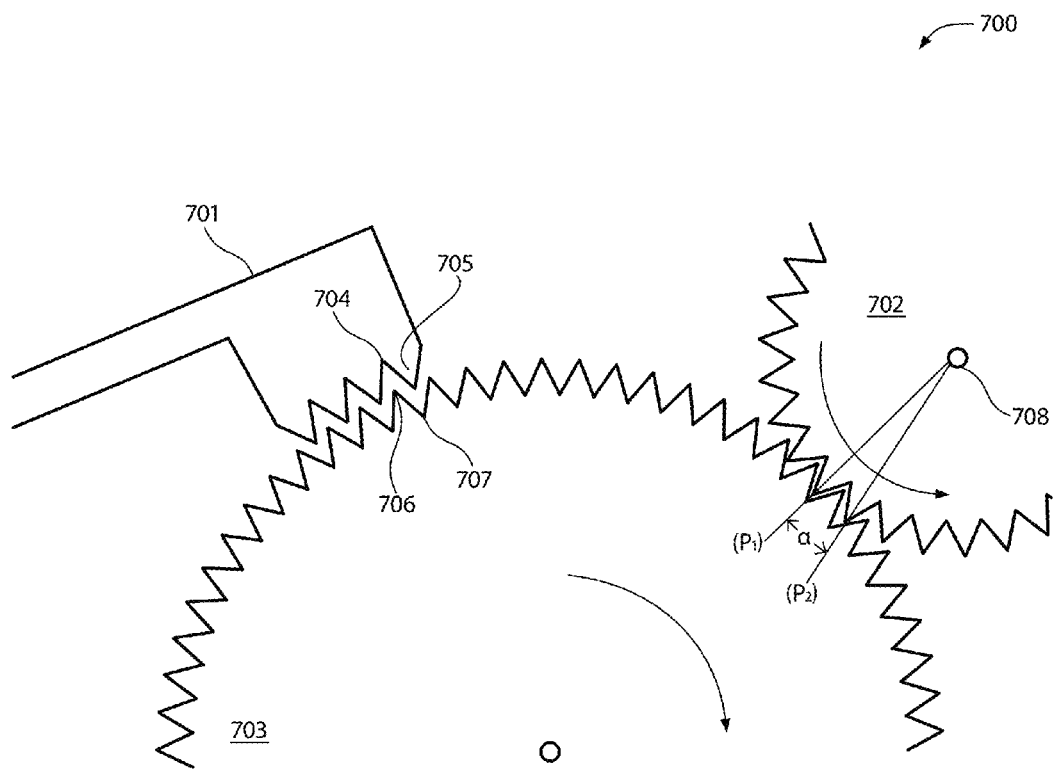
FIG. 7 includes an illustration representing rotational orientation of a locking device and one or more gears in accordance with an embodiment.

FIG. 7 illustrates a top drive assembly 700 including a locking device 701 and bull gear 703, and gear 702, in accordance with an embodiment. A drive motor may be directly coupled to gear 702, in which case gear 702 can be a drive pinion gear. Alternatively, gear 702 can be a separate pinion gear. The locking device 701 can include teeth 704 and grooves or valleys 705 that correspond to teeth 706 and grooves or valleys 707 of bull gear 703 with which the locking device 701 is configured to engage. Typically, however, it may not be known to the user or operator of the top drive assembly 700 whether the locking device 701 and the bull gear 703 are properly aligned. Thus, the locking device 701 may not successfully engage the bull gear 703, posing potential hazards or sub-optimal operating conditions. In order to determine whether the locking device 701 and the gear bull gear 703 are aligned, an operator typically "bumps" a drive motor to cause momentary rotation of the bull gear 703. Alternatively, or concurrently, the operator may engage and disengage the locking device 701 to determine if successful alignment or engagement has been achieved. These methods are met with varying degrees of success. Thus, the industry continues to demand improvements for operating a system for subterranean operations.

In accordance with an embodiment, a system for use in subterranean operation can further include a sensor 708 coupled to the gear 702 and configured to generate a signal at a first position ($P_1$) of the gear at a first time and a signal at a second position ($P_2$) of the gear at a second time different than the first time corresponding to the first position ($P_1$).

In an embodiment, a logic device can be configured to calculate an alignment value of the gear to which the sensor is directly or indirectly coupled, such as, for example, gear 702 or bull gear 703. The alignment value can correspond to a rotational angle at which the bull gear 703 can successfully be engaged with the locking device 701. In an embodiment, an alignment value can be defined by a rotational angle of a gear with respect to a predetermined position of the gear. As illustrated in FIG. 7, rotation of the gear 702 (as indicated by the counter-clockwise arrow) can induce rotation of the bull gear 703 (as indicated by the clockwise arrow). This rotation can provide for aligning the bull gear 703 with the locking device 701 within a range of an alignment value that will allow successful engagement of the locking device 701.

Figure 8A:
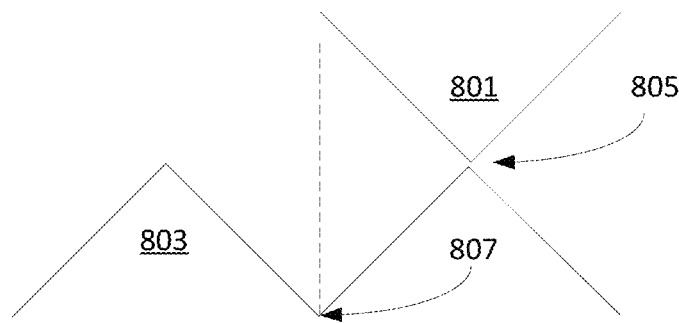
FIG. 8a illustrates a particular alignment between teeth of a bull gear and teeth of a locking device in accordance with an embodiment.
Figure 8B:
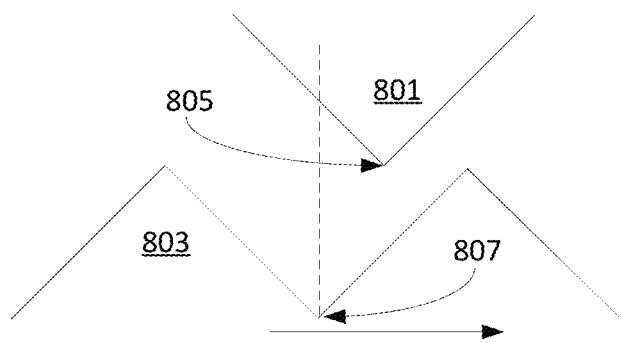
FIG. 8b illustrates a particular alignment between teeth of a bull gear and teeth of a locking device in accordance with an embodiment.
Figure 8C:
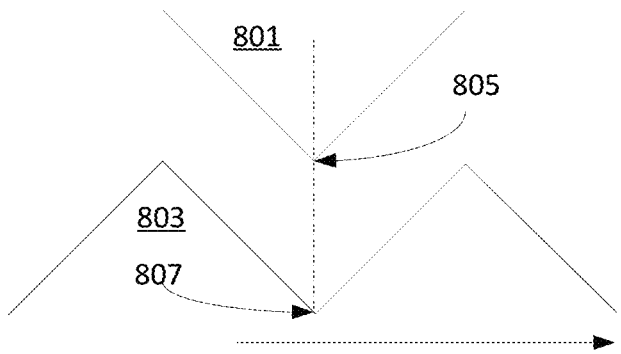
FIG. 8c illustrates a particular alignment between teeth of a bull gear and teeth of a locking device in accordance with an embodiment.

FIGS. 8a-8c illustrate particular alignments between teeth of a bull gear 803 and a locking device 801. For example, the dashed line indicates perfect alignment for successful engagement between the bull gear 803 and the locking device 801, when the tooth 805 of the locking device 801 is aligned with the groove 807 of the bull gear 803. It will be appreciated that a predetermined position of the bull gear 803 can be represented by one or more particular angles of rotation due to the several teeth of the bull gear 803 and, therefore, several possible alignment values that provide successful engagement with the locking device. In an embodiment, alignment values may be indicated by angles including integers. However, it may be desirable to determine a select few angles desirable for engagement of the locking device that may, for example, correspond to particular rotational orientations of a pipe handler assembly. In any case, the alignment value can be represented by a rotational angle from the predetermined position, such as by a value within a range of at least 0° to not greater than 360°.

FIG. 8a illustrates a misalignment of bull gear 803 with locking device 801 when the groove 807 of the bull gear 803 is not aligned with the tooth 805 of the locking device 801 for successful engagement. In an embodiment where alignment value is indicated by an integer, for example, the configuration of 8a can indicate that the tooth 805 of the locking device 801 is half-way in-between integer alignment values. In order to successfully engage the locking device 801, the bull gear 803 can be rotated, for example, clockwise as indicated by the arrow, which brings the groove 807 closer to perfect alignment (i.e. dashed line) with the tooth 805. FIG. 8b illustrates the groove 807 of the bull gear 803 having been rotated toward a desired alignment value, indicated by the dashed line. In the configuration illustrated in 8b, Although not in perfect alignment, the locking device 801 may or may not be successfully engaged. For example, depending on the angle of the teeth or grooves, or other considerations of the top drive assembly, a particular range of angles greater that or less than the alignment value may indicate that successful engagement of the locking device 801 can be achieved. FIG. 8c illustrates that further rotation of the bull gear 803 in the direction of the arrow can bring about perfect alignment for successful engagement between the bull gear 803 and the locking device 801, when the tooth 805 of the locking device 801 is aligned with the groove 807 of the bull gear 803.

In an embodiment, a logic device, such as logic device 504, can be configured to compare the alignment value to a threshold alignment value. The difference between the alignment value and the threshold alignment value can be defined as the deviation angle. The threshold alignment value can be defined as an angular deviation about a predetermined position. For example, a predetermined position of the gear can be represented by 0°, and the threshold alignment value can be represented by a rotational orientation from the predetermined position, such as by a value within a range of 0° to 360°. In other words, the threshold alignment value can be at least about 0° and not greater than about 360°. For example, the threshold alignment value can be at least about 1°, such as at least about 2°, at least about 3°, at least about 4°, at least about 5°, at least about 6°, at least about 7°, at least about 8°, or even at least about 9°. In a non-limiting embodiment, the threshold alignment value can be not greater than about 10°. For example, the threshold alignment value can be not greater than about 9°, such as not greater than about 8°, not greater than about 7°, not greater than about 6°, not greater than about 5°, not greater than about 4°, not greater than about 3°, not greater than about 2°, or even not greater than about 1°. It will be appreciated that the threshold alignment value can be in a range within any maximum or minimum value indicated above. The difference between the alignment value and the threshold alignment value (i.e., the deviation angle) can help indicate whether the gear 803 is in a position relative to the locking device that the locking device 801 can be successfully engaged.

In an embodiment, the logic device 504 can be configured to calculate the alignment value of a gear (such as bull gear 803) based upon a comparison of the current gear position information and stored data. Stored data can include locking device position information. It will be understood that although the locking device may be stationary with respect to the top drive assembly, the locking device position information can indicate a rotational orientation of a gear, such as the bull gear 803, to which the locking device 801 is configured to engage. Thus, the locking device position information can refer to one or more positions of the gear 803 that would affect proper or successful engagement of the locking device 801.

In a particular aspect, the logic device 504 can be configured to generate an alignment status based upon a comparison of the alignment value to the threshold alignment value. Comparison of an alignment status to a threshold alignment value can indicate a degree of alignment between the gear 803 and the locking device 801, such as a degree of alignment that is acceptable, unacceptable, or even nearly unacceptable. The alignment status can be indicated visually. For example, the alignment status can be indicated by a numerical value or symbol, etc., and can be indicated on a display screen, such as a monitor of a computer. In another embodiment, the alignment status can be indicated by a light. For example, the degree of alignment can be indicated by a green light (i.e. acceptable), red light (unacceptable), or yellow light (nearly unacceptable). In yet another embodiment, the alignment status can be indicated audibly, such as, for example, an alarm. The alarm can be configured to sound when the degree of alignment indicated by the alignment status has reached an acceptable or unacceptable degree for engaging the locking device 801 with the gear 803.

The logic device 504 can also be configured to generate a notification signal based upon the alignment status. The notification signal can be transmitted to notify a user, as discussed herein. In will be appreciated that the notification signal can be configured to notify a user to engage or to not engage the locking device 801.

In accordance with an embodiment, the logic device 504 can be configured to automatically operate a drive motor in rotational communication with a gear in rotational communication with the bull gear 803 to position the bull gear 803 within the threshold alignment value.

In an embodiment, the logic device 504 can be configured to cause the engagement of the locking device 801 based upon a comparison of the alignment value to the threshold alignment value. For example, the logic device 504 can be configured to engage the locking device 801 when the alignment value is within the threshold alignment value. The logic device 504 can also be configured to prevent engagement of the locking device 801. For example, in an embodiment, the logic device 504 can prevent engagement of the locking device 801 based upon a comparison of the alignment value to the threshold alignment value, such as when the alignment value is not within the threshold alignment value.

In accordance with an embodiment, a method for operating a system for use in subterranean operations can include operating a top drive assembly comprising a gear and a sensor coupled to the gear, as described herein. For example, operating a top drive assembly can include positioning the gear to a first position at a first time and generating a first signal, and positioning the gear to a second position at a second time different than the first time corresponding to the first position and generating a second signal.

In one aspect, a method for operating a system for use in subterranean operations in accordance with an embodiment can include calculating a wear status of the top drive assembly based upon one or more signals generated by the sensor. In an embodiment, calculating a wear status of the top drive assembly can be based upon the first signal.

In another aspect, a method for operating a system for use in subterranean operations can include operating a top drive assembly comprising a gear and a sensor coupled to the gear, and calculating an alignment value of the gear based upon one or more signals generated by the sensor.

The embodiments of the present application represent a departure from the state of the art. Notably, the embodiments herein demonstrate a new combination of components, systems, and processes facilitating improved operation of drilling systems, particularly for calculating wear of components of a drilling system. Unlike prior art methods that can cause untimely or extended time periods for repair or maintenance, the present embodiments have clear advantages in terms of detecting wear of a component of the drilling system and notifying a user of the wear. A user may then anticipate or affect timely maintenance or repair. In another aspect, the embodiments herein demonstrate a new combination of components, systems, and processes facilitating improved operation of drilling systems, particularly for calculating alignment of a gear for affecting proper or successful engagement of a locking device with the gear.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Items

Item 1. A system for use in subterranean operations, comprising:
  a top drive assembly comprising a gear;
  a sensor coupled to the gear and configured to generate a first signal at a first position of the gear at a first time and a second signal at a second position of the gear at a second time different than the first time corresponding to the first position; and
  a logic device configured to receive the first signal from the sensor and calculate a wear status of the top drive assembly.

Item 2. The system of item 1, wherein the first signal comprises position information.

Item 3. The system of item 1, wherein the logic device is configured to calculate the wear status based upon a comparison of the position information with stored data.

Item 4. The system of item 3, wherein the stored data includes stored position information.

Item 5. The system of item 4, wherein the stored position information comprises the second position of the gear at the second time.

Item 6. The system of item 3, wherein the stored data includes a moving average of position information received at two or more times.

Item 7. The system of item 3, wherein the stored data includes wear status information.

Item 8. The system of item 3, wherein the stored data includes previous position information.

Item 9. The system of item 3, wherein the stored data includes a threshold value.

Item 10. The system of item 9, wherein the threshold value is at least about 0°, at least about 1°, at least about 2°, at least about 3°, at least about 4°, at least about 5°, at least about 6°, at least about 7°, at least about 8°, at least about 9°, wherein the threshold value is not greater than about 10°, not greater than about 9°, not greater than about 8°, not greater than about 7°, not greater than about 6°, not greater than about 5°, not greater than about 4°, not greater than about 3°, not greater than about 2°, not greater than about 1°.

Item 11. The system of item 1, wherein the first signal comprises swing angle information.

Item 12. The system of item 10, wherein the swing angle information is defined as a maximum angle of rotation experienced by a component in rotational communication with the gear from a stop-power time to a stop-motion time.

Item 13. The system of item 12, wherein the component in rotational communication with the gear is a pipe handler.

Item 14. The system of item 1, wherein the wear status indicates a degree of wear.

Item 15. The system of item 14, wherein the degree of wear is acceptable.

Item 16. The system of item 14, wherein the degree of wear is nearly unacceptable.

Item 17. The system of item 14, wherein the degree of wear is unacceptable.

Item 18. The system of item 1, wherein the wear status is based upon a comparison of a wear status value to a threshold value.

Item 19. The system of item 18, wherein the wear status value is at least about 0°, at least about 1°, at least about 2°, at least about 3°, at least about 4°, at least about 5°, at least about 6°, at least about 7°, at least about 8°, at least about 9°, wherein the wear status value is not greater than about 10°, not greater than about 9°, not greater than about 8°, not greater than about 7°, not greater than about 6°, not greater than about 5°, not greater than about 4°, not greater than about 3°, not greater than about 2°, not greater than about 1°.

Item 20. The system of item 1, wherein the logic device is configured to notify a user based upon the wear status.

Item 21. The system of item 20, wherein notifying a user includes generating a signal to activate an alarm.

Item 22. The system of item 20, wherein notifying a user includes sending a signal to an offsite monitoring system.

Item 23. The system of item 20, wherein notifying a user includes displaying optical indicia.

Item 24. The system of item 1, wherein the wear status of the top drive assembly indicates wear on at least one component in rotational communication with the gear of the top drive assembly.

Item 25. A system for use in subterranean operations, comprising:
  a top drive comprising a gear;
  a drive motor coupled to the gear;
  a sensor coupled to the gear and configured to generate a first signal at a first position of the gear at a first time and a second signal at a second position of the gear at a second time different than the first time corresponding to the first position; and a logic device configured to receive the first signal from the sensor and calculate an alignment value of the gear.

Item 26. The system of item 25, wherein the first signal comprises current gear position information.

Item 27. The system of item 26, wherein the logic device is configured to calculate the alignment value of the gear based upon a comparison of the current gear position information and stored data.

Item 28. The system of item 27, wherein the stored data includes locking device position information.

Item 29. The system of item 25, wherein the logic device is configured to compare the alignment value to a threshold alignment value.

Item 30. The system of item 29, wherein the logic device is configured to generate an alignment status based upon a comparison of the alignment value to the threshold alignment value.

Item 31. The system of item 30, wherein the logic device is configured to generate a notification signal based upon the alignment status.

Item 32. The system of item 31, wherein the notification signal is configured to notify a user to engage the locking device.

Item 33. The system of item 31, wherein the notification signal is configured to notify a user to not engage the locking device.

Item 34. The system of item 29, wherein the logic device is configured to engage the locking device based upon a comparison of the alignment value to the threshold alignment value.

Item 35. The system of item 34, wherein the logic device is configured to engage the locking device when the alignment value is within the threshold alignment value.

Item 36. The system of item 29, wherein the logic device is configured to prevent engagement of the locking device based upon a comparison of the alignment value to the threshold alignment value.

Item 37. The system of item 36, wherein the logic device is configured to prevent engagement of the locking device when the alignment value is not within the threshold alignment value.

Item 38. The system of item 29, wherein the threshold alignment value is defined as an angular deviation about a predetermined position.

Item 39. The system of item 29, wherein the logic device is configured to notify a user of a deviation angle, wherein the deviation angle is defined as the difference between the alignment value and the threshold alignment value.

Item 40. The system of item 29, wherein the logic device is configured to automatically operate a drive motor in rotational communication with a gear to position a bull gear within the threshold alignment value.

Item 41. The system of item 38, wherein the threshold alignment value is at least about 0°, at least about 1°, at least about 2°, at least about 3°, at least about 4°, at least about 5°, at least about 6°, at least about 7°, at least about 8°, at least about 9°, wherein the threshold alignment value is not greater than about 10°, not greater than about 9°, not greater than about 8°, not greater than about 7°, not greater than about 6°, not greater than about 5°, not greater than about 4°, not greater than about 3°, not greater than about 2°, and not greater than about 1°.

Item 42. The system of item 25, wherein the alignment value is defined as an angular deviation about a predetermined position.

Item 43. The system of item 42, wherein the alignment value is at least about 0° and not greater than about 360°.

Item 44. The system of any one of items 1 or 25, wherein the top drive assembly is structurally supported by a derrick.

Item 45. The system of any one of items 1 or 25, wherein the top drive assembly includes a top drive.

Item 46. The system of any one of items 1 or 25, wherein the top drive assembly includes a pipe handler.

Item 47. The system of any one of items 1 or 25, wherein the top drive assembly includes a motor.

Item 48. The system of any one of items 1 or 25, wherein the sensor is a rotary position encoder.

Item 49. The system of any one of items 1 or 25, wherein the rotary position encoder is an absolute rotary position encoder.

Item 50. The system of any one of items 1 or 25, wherein the rotary position encoder is an incremental rotary position encoder.

Item 51. The system of any one of items 1 or 25, wherein the gear is a bull gear.

Item 52. The system of any one of items 1 or 25, wherein the gear is a motor pinion gear.

Item 53. The system of any one of items 1 or 25, wherein the gear is a pipe handler rotator gear.

Item 54. The system of any one of items 1 or 25, wherein the gear is configured to rotate a pipe handler coupled to the top drive.

Item 55. The system of any one of items 1 or 25, further comprising a drive motor coupled to the gear.

Item 56. The system of any one of items 1 or 25, wherein the logic device is a mechanical, optical, or electronic system that performs a logical operation on an input signal.

Item 57. The system of any one of items 1 or 25, wherein the logic device is a computer.

Item 58. A method for operating a system for use in subterranean operations, comprising the steps of:
operating a top drive assembly comprising a gear and a sensor coupled to the gear; and
calculating a wear status of the top drive assembly based upon a first signal generated by the sensor.

Item 59. The method of item 58, wherein the first signal is generated at a first position of the gear at a first time.

Item 60. The method of any one of items 58 or 59, further comprising generating a second signal at a second position of the gear at a second time different than the first time corresponding to the first position.

Item 61. A method for operating system for use in subterranean operations, comprising the steps of:
operating a top drive assembly comprising a gear and a sensor coupled to the gear;
positioning the gear to a first position at a first time and generating a first signal;
positioning the gear to a second position at a second time different than the first time corresponding to the first position and generating a second signal; and calculating a wear status of the top drive assembly based upon the first signal.

Item 62. The method of any one of items 60 or 61, wherein the first signal comprises position information.

Item 63. The method of item 62, wherein calculating the wear status includes calculating the wear status based upon a comparison of the position information with stored data.

Item 64. The method of item 63, wherein the stored data includes stored position information.

Item 65. The method of item 64, wherein the stored position information comprises the second position of the gear at the second time.

Item 66. The method of item 63, wherein the stored data includes a moving average of position information received at two or more times.

Item 67. The method of item 63, wherein the stored data includes wear status information.

Item 68. The method of item 63, wherein the stored data includes previous position information.

Item 69. The method of item 63, wherein the stored data includes a threshold value.

Item 70. The method of item 69, wherein the threshold angle value is at least about 0°, at least about 1°, at least about 2°, at least about 3°, at least about 4°, at least about 5°, at least about 6°, at least about 7°, at least about 8°, at least about 9°, wherein the threshold angle value is not greater than about 10°, not greater than about 9°, not greater than about 8°, not greater than about 7°, not greater than about 6°, not greater than about 5°, not greater than about 4°, not greater than about 3, °, not greater than about 2°, not greater than about 1°.

Item 71. The method of item 62, wherein the first signal comprises swing angle information.

Item 72. The method of item 71, wherein the swing angle information is defined as a maximum angle of rotation experienced by a component in rotational communication with the gear from a stop-power time to a stop-motion time.

Item 73. The method of item 72, wherein the component in rotational communication with the gear is a pipe handler.

Item 74. The method of any one of items 58 or 61, wherein the wear status indicates a degree of wear.

Item 75. The method of item 74, wherein the degree of wear is acceptable.

Item 76. The method of item 74, wherein the degree of wear is nearly unacceptable.

Item 77. The method of item 74, wherein the degree of wear is unacceptable.

Item 78. The method any one of items 58 or 61, wherein the wear status is based upon a comparison of a wear status value to a threshold value.

Item 79. The method of item 74, wherein the degree of wear is at least about 0°, at least about 1°, at least about 2°, at least about 3°, at least about 4°, at least about 5°, at least about 6°, at least about 7°, at least about 8°, at least about 9°, wherein the degree of wear is not greater than about 10°, not greater than about 9°, not greater than about 8°, not greater than about 7°, not greater than about 6°, not greater than about 5°, not greater than about 4°, not greater than about 3°, not greater than about 2°, not greater than about 1°.

Item 80. The method of any one of items 58 or 61, further comprising notifying a user based upon the wear status.

Item 81. The method of item 80, wherein notifying a user includes generating a signal to activate an alarm, Item 82. The method of item 80, wherein notifying a user includes sending a signal to an offsite monitoring system.

Item 83. The method of item 80, wherein notifying a user includes displaying optical indicia.

Item 84. The method of any one of items 58 or 61, wherein the wear status of the top drive assembly indicates wear on components in rotational communication with the gear of the top drive assembly.

Item 85. A method for operating a system for use in subterranean operations, comprising the steps of:
 operating a top drive assembly comprising a gear and a sensor coupled to the gear; and
 calculating an alignment value of the gear based upon a first signal generated by the sensor.

Item 86. The method of item 85, further comprising generating a notification signal based upon the alignment value.

Item 87. The method of item 85, further comprising engaging a locking device with the gear based upon the alignment value.

Item 88. The method of item 85, further comprising preventing the engagement of a locking device with the gear based upon the alignment value.

Item 89. The method of item 85, wherein the first signal comprises gear position information.

Item 90. The method of item 89, wherein calculating the alignment value includes calculating the alignment value based upon a comparison between the gear position information and stored data.

Item 91. The method of item 90, wherein the stored data includes locking device position information.

Item 92. The method of item 85, wherein calculating the alignment value includes comparing the alignment value to a threshold alignment value.

Item 93. The method of item 86, wherein controlling proper engagement of the locking device includes notifying a user to engage the locking device.

Item 94. The method of item 86, wherein controlling proper engagement of the locking device includes notifying a user to not engage the locking device.

Item 95. The method of item 86, wherein controlling proper engagement of the locking device includes engaging the locking device.

Item 96. The method of item 86, wherein controlling proper engagement of the locking device includes preventing engagement of the locking device.

Item 97. The method of item 92, wherein the threshold alignment value is defined as an angular deviation about a predetermined position.

Item 98. The method of item 92, further comprising notifying a user when the alignment value is within the threshold alignment value.

Item 99. The method of item 92, further comprising notifying a user of a deviation angle, wherein the deviation angle is defined as the difference between the alignment value and the threshold alignment value.

Item 100. The method of item 92, further comprising engaging the locking device with the gear when the alignment value is within the threshold alignment value.

Item 101. The method of item 92, further comprising automatically operating a drive motor in rotational communication with the gear to position the gear within the threshold alignment value.

Item 102. The method of item 92, further comprising preventing engagement of a locking device with the gear if the alignment value is not within the threshold alignment value.

Item 103. The method of item 97, wherein the threshold alignment value is at least about 0°, at least about 1°, at least about 2°, at least about 3°, at least about 4°, at least about 5°, at least about 6°, at least about 7°, at least about 8°, at least about 9°, wherein the threshold alignment value is not greater than about 10°, not greater than about 9°, not greater than about 8°, not greater than about 7°, not greater than about 6°, not greater than about 5°, not greater than about 4°, not greater than about 3°, not greater than about 2°, and not greater than about 1°.

Item 104. The method of item 85, wherein the alignment value is defined as an angular deviation about a predetermined position.

Item 105. The method of item 104, wherein the alignment value is in a range of 0° to 360°.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to not greater than all features of any of the disclosed embodiments. Thus, the following claims are incorporated into the Detailed Description of the Drawings, with each claim standing on its own as defining separately claimed subject matter.

What is claimed is:

1. A system for use in subterranean operations, comprising:
   a top drive assembly comprising a gear;
   a sensor coupled to the gear and configured to generate a first signal at a first position of the gear at a first time, wherein the first time corresponds to a stop-power time at which rotational power applied to the gear is ceased, and the first position corresponds to a rotational position of the gear at the stop-power time,
   the sensor further configured to generate a second signal at a second position of the gear at a second time different than the first time, wherein the second time corresponds to a stop-motion time at which a rotation of the gear is ceased after the stop-power time, and the second position corresponds to a rotational position of the gear at the stop-motion time; and
   a logic device configured to receive the first signal and the second signal from the sensor and calculate a swing angle, $\alpha$; defined as an angular difference between the first position and the second position.

2. The system of claim 1, wherein the logic device is further configured to calculate the a wear status based upon the swing angle.

3. The system of claim 1, wherein the logic device is further configured to calculate a wear status based upon a comparison of the swing angle with stored data.

4. The system of claim 3, wherein the stored data includes previous position information.

5. The system of claim 4, wherein the previous position information relates to the second position of the gear at the second time.

6. The system of claim 3, wherein the stored data includes an average of the swing angle based upon previous position information.

7. The system of claim 3, wherein the stored data includes wear status information.

8. The system of claim 3, wherein the stored data includes a threshold value of the swing angle, $\alpha$.

9. The system of claim 8, wherein the threshold value is at least about 0° and not greater than about 9°.

10. A system for use in subterranean operations, comprising:
    a top drive comprising a gear;
    a drive motor coupled to the gear;
    a sensor coupled to the gear and configured to generate a signal representing a rotational orientation of the gear with respect to a predetermined position; and
    a logic device configured to receive the signal from the sensor and calculate an alignment value of the gear by comparing the rotational orientation of the gear to stored data.

11. The system of claim 10, wherein the stored data includes position information of the locking device.

12. The system of claim 10, wherein the stored data comprises a threshold alignment value.

13. The system of claim 12, wherein the logic device is configured to generate an alignment status based upon a comparison of the alignment value to the threshold alignment value.

14. The system of claim 13, wherein the logic device is configured to generate a notification signal based upon the alignment status.

15. The system of claim 14, wherein the notification signal is configured to notify a user to engage the locking device.

16. The system of claim 14, wherein the notification signal is configured to notify a user to not engage the locking device.

17. The system of claim 12, wherein the logic device is configured to engage the locking device based upon a comparison of the alignment value to the threshold alignment value.

* * * * *